United States Patent [19]

Sechrist et al.

[11] Patent Number: 5,500,110
[45] Date of Patent: Mar. 19, 1996

[54] METHOD FOR CHANGING PARTICULATE TRANSPORT RATES BETWEEN ZONES

[75] Inventors: Paul A. Sechrist, Des Plaines; Roger R. Lawrence, Elmhurst; Frank T. Micklich, Joliet; Larry D. Richardson, Roselle; David M. Kazell, Libertyville, all of Ill.

[73] Assignee: UOP, Des Plaines, Ill.

[21] Appl. No.: 239,003

[22] Filed: May 6, 1994

[51] Int. Cl.⁶ ............................. C10G 35/10; C10G 35/24
[52] U.S. Cl. ........................ 208/173; 208/164; 208/174; 208/176; 208/DIG. 1; 208/134
[58] Field of Search ........................ 208/164, 173, 208/174, 176, DIG. 1, 134

[56] References Cited

U.S. PATENT DOCUMENTS

| | | | |
|---|---|---|---|
| 3,547,809 | 12/1970 | Ehrlich et al. | 208/176 |
| 3,687,841 | 8/1972 | Saxton et al. | 208/DIG. 1 |
| 3,689,403 | 9/1972 | Long | 208/DIG. 1 |
| 3,707,463 | 12/1972 | Harter et al. | 208/DIG. 1 |
| 3,753,893 | 8/1973 | Lee et al. | 208/DIG. 1 |
| 3,850,582 | 11/1974 | Luckenbach | 208/DIG. 1 |
| 4,059,502 | 11/1977 | James | 208/DIG. 1 |
| 4,062,761 | 12/1977 | Luckenbach | 208/164 |
| 4,093,537 | 6/1978 | Gross et al. | 208/DIG. 1 |
| 4,345,993 | 8/1982 | Stewart | 208/164 |
| 4,576,712 | 3/1986 | Greenwood | 208/DIG. 1 |

OTHER PUBLICATIONS

"The TCC Airlift" by: Jean M. Bourguet, Robert D. Drew, and Stephen Valentine, III Socony Mobil Oil Company, Inc., Paulsboro, New Jersey published in: *American Institute of Chemical Engineers* Presented at the Forty–Third National Meeting; Tulsa, Oklahoma; Sep. 25 to 28, 1960.

*Primary Examiner*—E. Rollins Cross
*Assistant Examiner*—Walter D. Griffin
*Attorney, Agent, or Firm*—Thomas K. McBride; John G. Tolomei

[57] ABSTRACT

A controlled method of changing the transport rate of particles between two zones is disclosed. Changes are made in a computed value of the pressure difference of the conduit between the two zones through which the particles are transported. The changes are of a predetermined magnitude and are performed at predetermined time intervals, until the desired final value of the pressure difference is reached. The method minimizes fluctuations in the pressures of the two zones without over-sized vessels or additional equipment that would otherwise be needed to accommodate pressure changes. This results in a savings in construction costs. This invention is adaptable to a multitude of processes for the catalytic conversion of hydrocarbons in which deactivated catalyst particles are regenerated.

23 Claims, 2 Drawing Sheets

METHOD FOR CHANGING PARTICULATE TRANSPORT RATES BETWEEN ZONES

FIELD OF THE INVENTION

The broad field of the present invention is the handling and transport of particles. The narrow field of the present invention is the control of changing the rate of transporting particles, at least partially by pneumatic means.

BACKGROUND OF THE INVENTION

Catalytic processes for the conversion of hydrocarbons are well known and extensively used. In many of these processes, the catalyst consists of particles that are transported between two or more catalyst-containing vessels. The reason why the catalyst is transported varies depending on the process. For example, the catalyst may be transported from one reaction vessel into another reaction vessel in order to take advantage of different reaction conditions in the two vessels in order to improve product yields. In another example, the catalyst may first be transported from a reaction vessel into a regeneration vessel in order to rejuvenate the catalyst, and after rejuvenation, the catalyst may be transported back to the reaction vessel.

The vessels between which the catalyst is transported are not necessarily adjacent, and indeed it is common that the outlet of the source vessel, that is the vessel from which the catalyst is transported, may be a significant distance horizontally and vertically from the inlet of the destination vessel, that is the vessel to which the catalyst is transported. An inexpensive and common method of transferring catalyst over significant vertical and horizontal distances is by pneumatic conveying through a conduit. Pneumatic conveying is well known to those skilled in the art of transporting particles. Pneumatic conveying is described at pages 5–46 to 5–48 in *Perry's Chemical Engineers' Handbook*, Sixth Edition, ed. by Don W. Green, McGraw–Hill ed., McGraw–Hill Book Company, New York, 1984.

One of the problems associated with pneumatic conveying is that the pressure difference across the conduit between the source and destination vessels varies depending on the transport rate of catalyst through the conduit. For example, the pressure difference across the conduit when gas is flowing at its design rate and no catalyst is flowing may be only 1–5 in. $H_2O$, but the pressure difference when gas and catalyst are both flowing at their design rates may be 150–250 in. $H_2O$. Without a means for controlling this increase in pressure difference, either the pressure in the source vessel will rise or the pressure in the destination vessel will fall. In those processes where catalyst is entering the source vessel by gravity flow at the same time that catalyst is being transported out of the source vessel through the conduit, a surge of 150–250 in. $H_2O$ in the pressure of the source vessel can stop or even reverse the flow of catalyst into the source vessel. This situation is unacceptable in those processes in which it is important that the flow of catalyst into the source vessel be continuous or that the pressure of the source vessel be kept from changing rapidly.

The pressure difference across a conduit has been used as an indicator in methods of controlling the rate of pneumatic transport of particles through the conduit. Typically, these methods have comprised providing a controller with a desired value of the pressure difference, measuring with a device the actual value of the pressure difference, comparing the desired and actual values, and finally changing the rate of transport until the actual and desired values of the pressure difference are substantially equal.

Control methods like the ones just described suffer from large and rapid fluctuations in the pressures in the source zone, the destination zone, or both. Changes from one value of the desired pressure difference to another value of the desired pressure difference are made instantaneously and in one step. Changes in the rate of transport cause fluctuations that necessitate the use of larger and/or extra vessels and higher rates for making up and venting gases from the process in order to attempt to control the pressure fluctuations.

INFORMATION DISCLOSURE

Allowed U.S. application Ser. No. 07/998,331 now U.S. Pat. No. 5,338,440 discloses a method of using a surge zone, a blower, and two regulating valves to control the pressure fluctuations between two zones during catalyst transport.

BRIEF SUMMARY OF THE INVENTION

This invention is a method of controlling the rate of change of the catalyst transport rate between two zones through a conduit in order to prevent uncontrolled fluctuations in the pressures in either zone. The method comprises controlling the rate of change of catalyst transport through the conduit such that the pressure difference across the conduit does not change too rapidly. The method is particularly suitable when catalyst transport is started, which is when the relative increase in pressure difference across the conduit would otherwise be the greatest. But the method is also suitable after catalyst transport is already started, either for increasing transport or for decreasing transport. The method does not require the use of any additional vessels and regulating valves other than those required for the normal catalyst transport.

In a broad embodiment, this invention is a method for controlling the transport of particles from a source zone to a destination zone. A transport stream comprising a fluid is passed to a source zone. Particles and the fluid are withdrawn from the source zone and passed through a conduit and to a destination zone. A computed value of an indicator that is in response to the rate of transport of the particles from the source zone to the destination zone is determined. The computed value is compared with the actual value of the indicator. A control signal is generated that is in response to the difference between the computed value and the actual value. The control signal is employed to actuate a means to control the rate of transport of particles from the source zone to the destination zone. The computed value is increased or decreased in at least two increments to a final value of the indicator. At least two different increased or decreased computed values are compared with the actual value of the indicator. The control signal is updated at least twice in response to the difference between the increased or decreased computed values and the actual value in order to sequentially generate at least two updated control signals. The updated signals are employed at least twice to actuate the means to control the rate of transport of particles from the source zone to the destination zone.

In a more detailed embodiment, this invention is a hydrocarbon conversion process for contacting a hydrocarbon-containing feedstream with a particulate catalyst at hydrocarbon conversion conditions in a reaction zone. Deactivated catalyst from the reaction zone passes from a bottom location to a top location in a regeneration zone.

After reactivation, the catalyst passes from a bottom location of the regeneration zone to a top location of the reaction zone. The process comprises controlling the transport of the catalyst from the bottom to the top locations. Catalyst passes downward from a bottom location to a fluid-controlled valve. Regulation of the flow of a fluid to the fluid-controlled valve delivers a controlled flow of catalyst to a lift conduit. The lift conduit conveys the catalyst upwardly with the fluid and discharges the catalyst to the top location. A computed value of the pressure difference across at least a portion of the lift conduit is determined. The computed value is compared with the actual value of the pressure difference across the portion of the lift conduit. A control signal that is in response to the difference between the computed value and the actual value is generated. The control signal is employed to regulate the flow of the fluid to the fluid-controlled valve to deliver catalyst to the lift conduit. The computed value is increased or decreased in at least two increments to a final value of the pressure difference using the equation:

$$S_1 + S_0 * (1+X)$$

where $S_0$ is a previous computed value, $S_1$ is the increased or decreased computed value, and X is a predetermined number greater than $-1.0$ and less than $1.0$. At least two different increased or decreased computed values are compared with the actual value of the pressure difference. The control signal is updated at least twice in response to the difference between the increased or decreased computed values and the actual value in order to sequentially generate at least two updated control signals. The updated control signals are employed at least twice to regulate the flow of the fluid to the fluid-controlled valve to deliver catalyst to the lift conduit.

Other objects, embodiments, and details of the present invention are presented in the following detailed description of the invention.

DETAILED DESCRIPTION OF THE INVENTION

Figure 1:
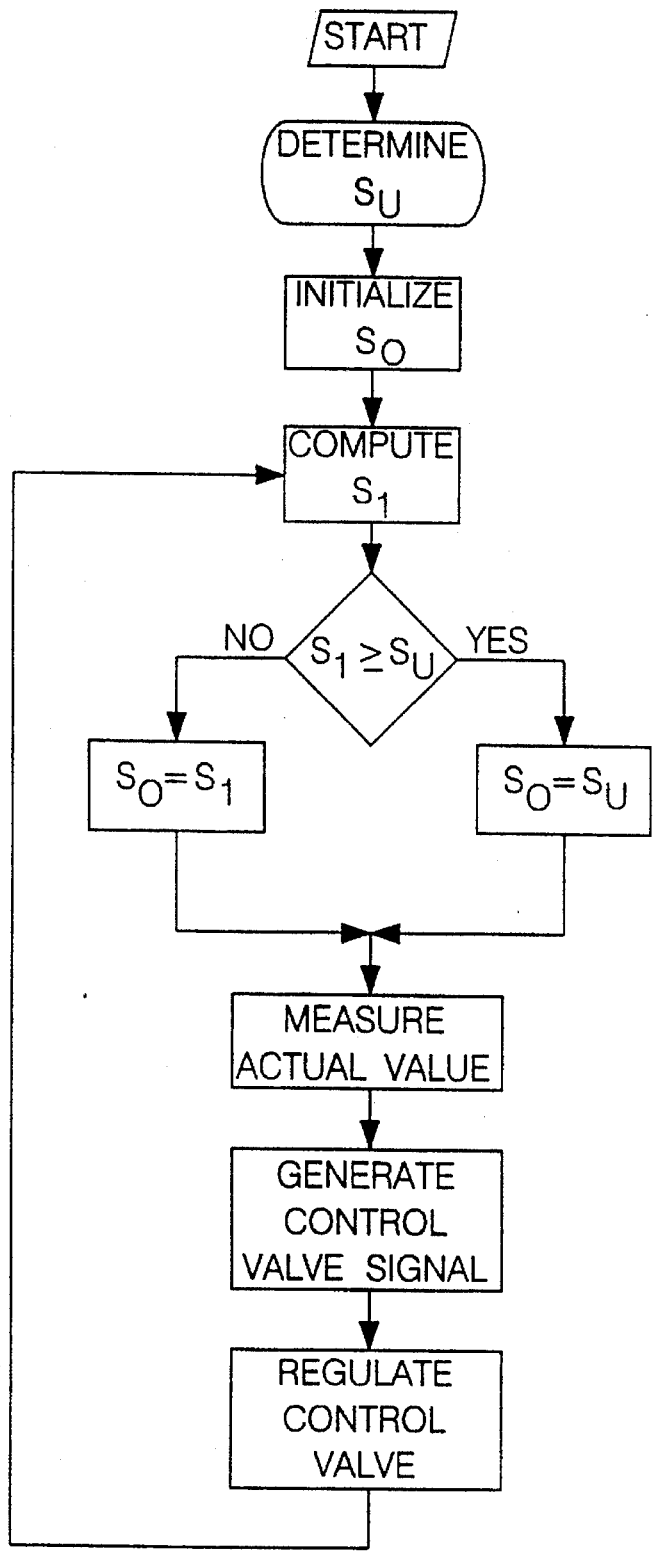
FIG. 1 is a flow sheet for a system for controlling the pressure difference across a conduit for pneumatic conveying between two zones and illustrating the principles of the invention.

The present invention can be applied to any system wherein particles require transport by pneumatic conveying in a manner that will reduce the fluctuations in the pressures of the vessels between which the particles are conveyed. Particles suitable for use in this invention will normally comprise geometric shapes of regular size. The maximum dimension of the particles will be substantially less than the conduits used for conveyance and transport of the particles. In most cases, the particles will have a maximum dimension of less than ½ inch. The most preferred type of particles is catalyst particles in use in hydrocarbon conversion processes. This invention, as applied to petroleum refining may be employed in a wide variety of hydrocarbon conversion reactions including catalytic reforming, fixed-bed alkylation, hydrorefining, hydrocracking dehydrogenation, hydrogenation, steam reforming, etc.

The most widely practiced hydrocarbon conversion process to which the present invention is applicable is catalytic reforming. Therefore the discussion herein of the present invention will be in reference to its application to a catalytic reforming reaction system. It is not intended that this discussion limit the scope of the present invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information on reforming processes may be found in, for example, U.S. Pat. Nos. 4,119,526 (Peters et al.); 4,409,095 (Peters); and 4,440,626 (Winter et al.).

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The particles are usually spheroidal and have a diameter of from about 1/16th to about 1/8th inch (1.5–3.1 mm), though they may be as large as ¼th inch (6.35 mm). In a particular reaction-regeneration system, however, it is desirable to use catalyst particles which fall in a relatively narrow size range. A preferred catalyst particle diameter is 1/16th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In a preferred form, the reformer will employ a moving bed reaction zone and regeneration zone. The present invention is applicable to either a moving bed regeneration zone or a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multi-step regeneration process is used to remove the coke deposits and recondition the catalyst to restore its full reaction promoting ability. The art of moving bed regeneration zones is well known and does not require detailed description herein.

Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it may be semicontinuous. By semi-continuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

The majority of the description of the present invention is presented in terms of transferring catalyst particles from a reaction zone containing hydrocarbon to a regeneration zone containing oxygen using nitrogen as a conveying or lift fluid. However, this description is not intended to limit the scope of the invention to this particular arrangement.

The principles of this invention will be described by reference to FIG. 1, which is a logic flow sheet showing the steps of this invention. The invention will be described in terms of conveying catalyst particles pneumatically from a source vessel to a destination vessel using a conveying or lift fluid.

Prior to the start of the method of this invention, an indicator of the rate of transport of catalyst particles must be selected. The primary requirement for the indicator of the rate of transport is that a discernable relationship exists between the indicator and the rate of transport of catalyst particles. Preferably, there is a one-to-one correspondence, such as a mathematical relationship, between a given rate of transport and a given value of the indicator such that, if one knows or chooses a rate of transport, then using the relationship one can determine the corresponding value of the indicator, and vice versa. As described previously, pneumatic conveying of particles causes an increase in the pressure difference across the conduit between the source and destination vessels. Therefore, three possible indicators of the rate of transport are the pressure of the source vessel, the pressure difference across the conduit, and the pressure of the destination vessel. The rate of change of the quantity of catalyst particles in either the source vessel or the destination vessel may also be an indicator of the rate of transport, provided that, other than the catalyst particles that are being conveyed from the source zone to the destination, catalyst particles are not otherwise flowing into or out of either vessel. In this case, then, the rate of change in the level of catalyst in either vessel would be indicative of the rate of transport between the vessels. For the purposes of this description, the indicator of the rate of transport between the two vessels is the pressure difference across the conduit between the source vessel and the destination vessel. However, this description is not intended to limit the scope of the invention to this particular arrangement.

After the indicator of the rate of transport is selected, a final value of rate of transport is determined. The final value of the rate of transport is the ultimately-desired rate of transport that one wishes to attain. It is a final, or target, value that one seeks to attain rather than an intermediate value that one may incidentally attain in the process of changing the rate of transport. After the final value of the rate of transport is determined, the previously-mentioned relationship between the rate of transport and the pressure difference is used to determine a final value of the pressure difference that corresponds to the final value of the rate of transport. For the purposes of this description, this final value of the pressure difference will be designated $S_U$.

After the final value of the pressure difference is determined, the computed value of the pressure difference is initialized. For the purposes of this description, the computed value of the pressure difference will be designated $S_0$. $S_0$ is a desired value of the pressure difference that is to be adjusted in at least two increments until it attains the final value of the pressure difference. But, prior to any adjustment, $S_0$ is initialized at a starting value. Although $S_0$ may be initialized at any value that is between the present actual value of the pressure difference and $S_U$, it is preferred that $S_0$ be initialized at the present actual value of the pressure difference. The present actual value of the pressure difference can be determined using a pressure difference measuring device that measures the pressure difference across the conduit between the source and destination zones.

After the computed value of the pressure difference is initialized, an updated computed value of the pressure difference is determined. For the purposes of this description, this updated computed value of the pressure difference will be designated $S_1$. $S_1$ may be computed by an equation that may be a function of variables that include time; the present actual value; $S_0$; and $S_U$. What is important is that $S_1$ does not differ from $S_0$ by more than the absolute value of the difference between the initialized value of $S_0$ and $S_U$. In this way, the computed value is not adjusted from the initialized $S_0$ to $S_U$ in one increment. It is an essential requirement of this invention that the computed value be increased or decreased in at least two increments from the initialized $S_0$ to $S_U$.

After the updated computed value ($S_1$) is determined, it is preferred that $S_1$ be compared with the final value ($S_U$). Consider the situation where $S_0$ is being increased to $S_U$: if $S_1$ is less than $S_U$, then the $S_0$ is assigned the value of $S_1$; but if $S_1$ is greater than or equal to $S_U$, then the $S_0$ is assigned the value of $S_U$. This comparison of $S_1$ and $S_U$ helps to ensure that, as $S_1$ is increased or decreased towards $S_U$, $S_1$ does not go beyond $S_U$. This step improves the steadiness of the control of the pressure difference and prevents "cycling" of $S_1$ above and below $S_U$ when $S_1$ approaches $S_U$.

After the updated computed value ($S_1$) is determined, $S_1$ is compared with the present actual value of the pressure difference. A signal is generated in response to the difference between the $S_1$ and the present actual value. This signal is then employed to actuate a means to control the rate of transport of particles from the source zone to the destination zone. In pneumatic conveying, this means is typically a control valve that regulates the flow rate of transport gas. Regardless of the means to control, as the rate of transport of particles is adjusted, the present actual value of the pressure difference, as measured by a pressure difference measuring device, will change, too.

In keeping with the requirement that the computed value of the pressure difference is not adjusted from the present actual value to the final value in only one increment, it is a requirement of this invention that an updated computed value be compared at least twice with the present actual value. And, moreover, a signal that is generated in response to the difference between the updated computed value and the present actual value is updated at least twice. Thus, at least two updated control signals are generated, and these signals are employed at least twice to actuate the means to control the rate of transport of particles from the source zone to the destination zone.

From the previous description, it is apparent that the steps of computing an updated computed value, comparing the updated computed value with final value, assigning a value to the computed value, measuring the actual value, generating a control valve signal, and actuating the control valve to control the rate of catalyst transport constitute a cyclical sequence of steps that repeats at least twice. When the cycle completes, it restarts again. The frequency at which the cycle repeats is variable, thereby accommodating differences in the times for the individual steps to occur and in the time in which the controlled process responds. Preferably, the updated control signal is generated at least every 60 seconds, and more preferably the updated control signal is generated at least every 0.1 seconds.

From the previous description, the equation that is used to compute updated computed values of the pressure difference may take on a number of different forms and include a number of different variables. For example, the equation may be as follows:

$$S_1 = S_0 * (1+X).$$

In this equation, X is a predetermined number that is the fraction of the computed value by which the updated computed value is greater than the computed value. It may conveniently be thought of as a step-value that is greater than zero when the updated computed value is to be increased above the computed value, that is, when the transport rate through the conduit is to be increased. Likewise, X is less than zero when the updated computed value is to be decreased below the computed value, that is, when the transport rate through the conduit is to be decreased. Generally, X is between −1.0 and +1.0. Preferably, it is between +0.025 and +1.0 when the transport rate is to be increased, and it is between −0.025 and −1.0 when the transport rate is to be decreased. More preferably, it is between +0.1 and +0.5 when the transport rate is to be increased, and it is between −0.1 and −0.5 when the transport rate is to be decreased.

Figure 2:
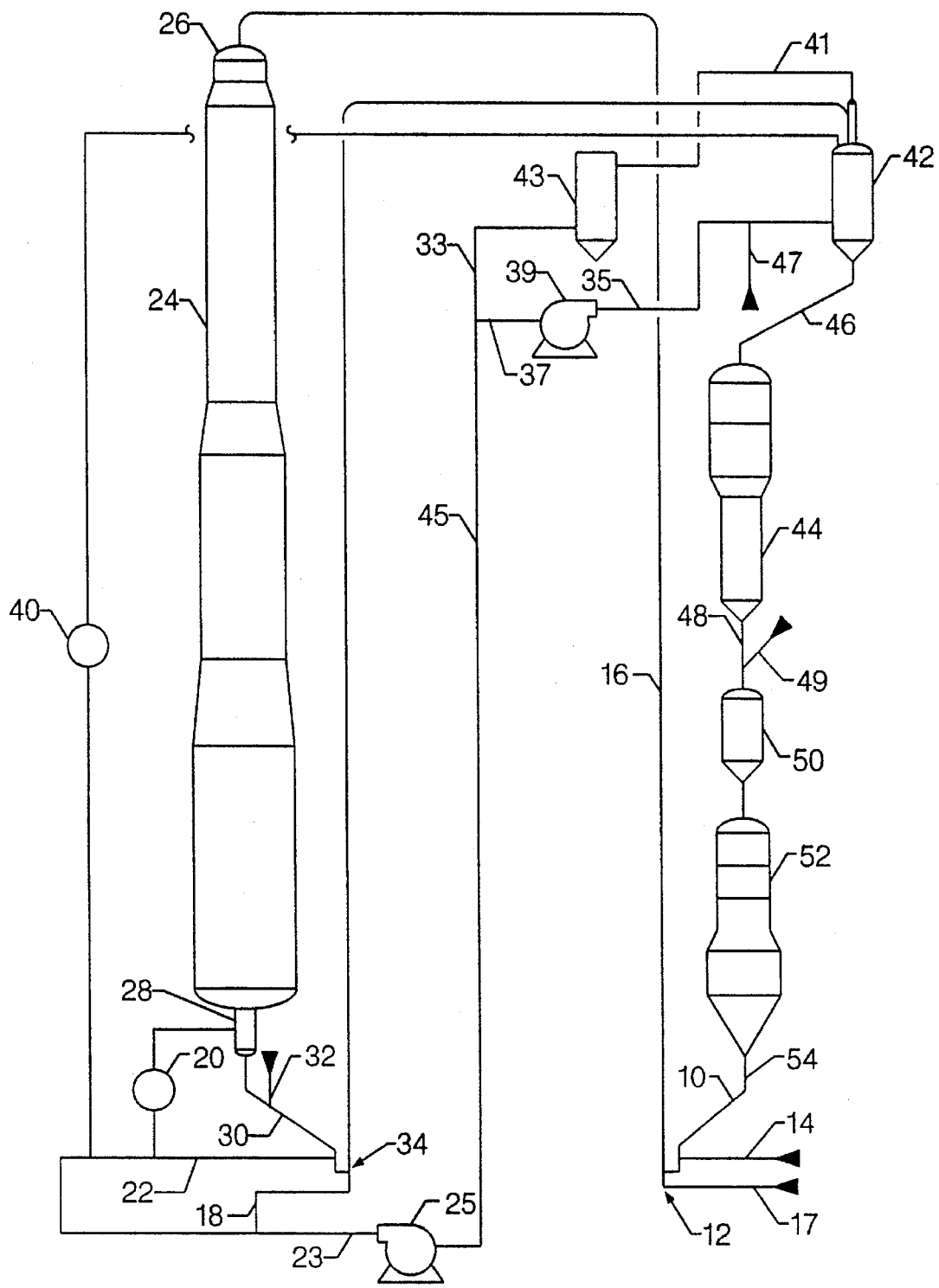
FIG. 2 is a schematic flow diagram of a process application of the present invention, in which only those lines, valves, etc., relevant to the flow of catalyst particles are shown.

Prior to the start of the control method of this invention, catalyst is present in the source zone. The catalyst is placed into the source zone by any suitable means, and such means, although not an essential element of the method, will depend on the particular process to which this invention is applied. FIG. 2 illustrates a reactor and regenerator system for a reforming reaction zone that uses the catalyst particle transport system of this invention to move catalyst. Starting then with the movement of regenerated catalyst, a lower conduit 10 supplies catalyst particles to a non-mechanical valve 12. Catalyst flows in dense phase transport through conduit 10. Dense phase transport refers to a flow where the catalyst particles essentially occupy the entire volume of the conduit. A regulating fluid enters valve 12 through a line 14 at a rate that regulates the transfer of catalyst particles through the valve 12 into a lift conduit 16. As catalyst particles enter lift conduit 16, a lift fluid enters the bottom of the lift conduit through a line 17 and transports the catalyst particles upwardly through lift conduit 16. Catalyst particles are transported up the lift conduit in a transport mode where the flow of lift fluid is sufficient to lift the particles upwardly through the conduit. The lift fluid is usually added in sufficient amounts to create a superficial gas velocity through the lift conduit of at least 10 feet per second and more typically 25 to 30 feet per second. Over most of its length, the lift conduit extends in a substantially vertical direction. By substantially vertical in this context it is meant that the conduit will vary from the vertical by no more than 10° and preferably no more than 5°. At the top of the substantially vertical length, the lift conduit extends in either a substantially horizontal or a downwardly sloping direction to a location above the stacked reactor arrangement 24, and from there it extends in a substantially vertical direction to the top of the stacked reactor, which the particles and lift fluid enter. By substantially horizontal in this context it is meant that the conduit will vary from the horizontal by no more than 10° and preferably no more than 5°. By downwardly sloping in this context, it is meant that the conduit will vary from the horizontal by between 10° and 30°. This angle is set as the angle necessary for the catalyst particles to just maintain steady sate movement through the conduit, and it has been found that a 20° angle is preferred.

Catalyst flows from the top to the bottom of the stacked reactor arrangement and passes through multiple stages of reaction in which process fluids contact the catalyst particles. Details of the contacting beds and other internals of the stacked reactor arrangement are well known to those skilled in the art and permit continuous or intermittent flow of the catalyst particles from the top 26 of the stacked reactor arrangement to a lower retention chamber 28 at the bottom of the stacked reactor arrangement.

Catalyst particles flow from the bottom of the stacked reactor arrangement through a lower conduit 30. It may be desirable to add catalyst particles to the reactor regenerator system in places where the catalyst flows in dense phase flow. Preferred locations for adding catalyst particles are in regions where there is dense phase catalyst movement. Thus, catalyst particles may be added through a conduit 32 into lower conduit 30. Lower conduit 30 also displaces hydrogen and hydrocarbons form the dense flowing stream of catalyst particles to prevent any carry over of hydrogen and hydrocarbon into the regenerator side of the process. A device 20 measures the pressure difference across the lower conduit 30. At the bottom of lower conduit 30 a non-mechanical valve 34 operates in a manner similar to that described for non-mechanical valve 12 to transfer catalyst particles upwardly through a lift conduit 36. A regulating fluid enters valve 34 through a line 22 and a lift fluid enters the bottom of the lift conduit through a line 18. Both fluids are provided through a line 23 from a blower 25.

Catalyst particles travel up through lift conduit 36 in a manner similar to that described for lift conduit 16, into a disengaging hopper 42. A device 40 measures the pressure difference across the lift conduit 36. Catalyst flows downwardly in essential dense phase flow through disengaging hopper 42 and a regeneration vessel 44 which receives catalyst from the disengaging hopper via a conduit 46. The disengaging hopper maintains a volume of catalyst to balance transitory differences in the flow that may occur during an intermittent transport of catalyst through the reactor stack and the regenerator vessel.

An elutriation fluid enters disengaging hopper 42 through a line 35 at a rate that separates broken or chipped catalyst particles and catalyst fines from the whole catalyst particles which exit the bottom of the disengaging hopper 42. The catalyst chips, the catalyst fines, and the elutriation fluid exit the top through a line 41 and enter a bag dust collector 43. The catalyst chips and fines are filtered from the elutriation fluid, which exits the collector through a line 33. A portion of the elutriation fluid enters a blower 39 through a line 37 and is recycled to the disengaging hopper through the line 35. It may be necessary to add elutriation fluid to the catalyst lift system because of losses of fluid, such as fluid that passes with the catalyst into the regeneration vessel 46 from the disengaging hopper 42. It may be desirable to add this fluid in places where elutriation fluid flows in the absence of catalyst. Preferred locations for adding elutriation fluid are in regions where catalyst has been separated from the elutriation fluid stream. Thus, elutriation fluid may be added through a line 47 into the line 35. Another portion of the elutriation fluid that exits from the collector 33 enters the blower 25 through the line 45. In this embodiment, therefore, the same fluid is used for the elutriation fluid to disengaging hopper 42, the regulating fluid to valve 34, and the lift fluid to lift conduit 36, and the preferred fluid is nitrogen.

After removal of coke and reconditioning of catalyst particles in the regeneration vessel 44, a conduit 48 transfers catalyst to a nitrogen seal drum 50 and a lock hopper arrangement 52. A conduit 49 may also provide a location for introducing additional catalyst into the catalyst transport system via a conduit 49. The seal drum and lock hopper arrangement 52 control the transfer of catalyst back to the reactor via the previously described lift arrangement. The nitrogen seal and lock hopper arrangement also displace oxygen gas from the dense flowing stream of catalyst particles to prevent any carry over of oxygen into the reactor side of the process. Lock hopper and seal drum arrangements are well known to those skilled in the art and may be used in any of their current well known forms to supply a dense phase flow of catalyst through a vertical conduit 54 and into lower conduit 10.

Lower conduit 10 transfers catalyst horizontally from the vertical center line of the regeneration vessel 44 to the non-mechanical valve 12. Preferably conduit 10 will have an angle from the horizontal that is greater than 30°. An angle greater than 30° avoids stratification of the flow wherein catalyst flows over a lower portion of the line while gas flows through an upper portion. Stratified flow is undesirable in lower angled conduit 10 because it reduces pressure drop for gas flow through the line and prevents the maintenance of a gas seal.

Lower angled conduit 10 delivers dense phase catalyst to the non-mechanical valve 12. Non-mechanical valve can take on forms such as L valves, J valves, and K valves. Such valves are well known as is their use of aeration gas in conjunction with a geometrical shape to control the flow rate of particulate solids through it. The L, J, and K generally refer to the overall configuration formed by the geometric shape of the piping that transfers the particulate solids. Aeration gas enters the piping geometry formed by the valve at a location where it will create a drag force on the particles sufficient to initiate particle movement through the valve. Further information on the operation of such valves can be found in the text entitled GAS FLUIDIZATION TECHNOLOGY, edited by D. Geldart, John Wiley & Sons, 1986, and U.S. Pat. No. 4,202,673, the contents of which are hereby incorporated by reference.

From the previous description, two separate devices measure two separate pressure differences in the process, namely the pressure difference across the lower conduit 30 and the pressure difference across the lift conduit 36. One of the objectives of this invention is to control these two pressure differences. First, device 20 measures the pressure difference across the lower conduit 30 between the lower retention chamber 28 at the bottom of the stacked reactor arrangement 24 and the non-mechanical valve 34. The purpose for controlling this pressure difference is that it determines in part the flow rates of the catalyst and fluid between the lower retention chamber 28 and the non-mechanical vane 34. As previously mentioned, the lower conduit 30 is a means not only to convey catalyst, but also to purge hydrogen and hydrocarbons from the catalyst that exits the lower retention chamber 28. A purge stream comprising lift fluid flows through the lower conduit 30 countercurrent to the catalyst flow, and preferably the flow rate of the purge stream is sufficient to purge the hydrogen and hydrocarbons from the total void volume in the lower conduit 30. On the other hand, an excessive flow rate of the purge stream can terminate the flow of catalyst particles through the lower conduit 30. Therefore, unless the pressure difference between the lower retention chamber 28 at the bottom of the stacked reactor arrangement 24 and the non-mechanical valve 34 is controlled, the catalyst may be incompletely purged or the catalyst flow may be completely stopped.

Although a zone that can purge hydrogen and hydrocarbon from catalyst that exits the lower retention chamber 28 may be of a variety of different shapes and may comprise internal baffles to help ensure adequate purging, the simplest form of purge zone comprises a single conduit such as the lower conduit 30 in which the purge stream flows countercurrently to the catalyst. The purge stream comprises the fluid that is employed for lifting the catalyst, which is preferably nitrogen. Any lift fluid is suitable, however, subject to the provision that it is not substantially detrimental to the performance of the other zones into which it might enter, such as the reactor or the regenerator, as a result of its operating conditions, such as its rate of entry, its temperature, or its concentration in the other zones.

The flow rate of the purge stream through the lower conduit 30 is not sufficient to terminate the flow of catalyst through the lower conduit 30, thereby allowing the catalyst to flow at least intermittently through the lower conduit 30. Preferably, the flow rate is not sufficient to fluidize the catalyst contained in the lower conduit 30. In addition, the flow rate of the purge stream is sufficient to purge hydrogen and hydrocarbon from the total void volume in the lower conduit 30. The total void volume in the lower conduit is defined as the volume of the pores within the catalyst particles plus the voltage volume between the catalyst particles in the lower conduit 30. The physical characteristics of the catalyst determine the volume of the pores within the catalyst particles, and the voltage volume between the catalyst depends on how densely the catalyst particles are packed in the lower conduit 30. Since the rate at which the total void volume enters the catalyst-withdrawal conduits depends on the rate of flow of the catalyst particles, the flow rate of the purge stream that is effective to purge hydrocarbon from the total void volume depends on the rate of flow of the effluent stream. Preferably, the ratio of purge stream volume to total void volume is at least 1, and the residence time of the catalyst particles in the purge zone is between 0.1 and 60 minutes. The nitrogen, with hydrogen and hydrocarbon, passes from the top end of lower conduit 30 and to the lower retention chamber 28. The nitrogen is ultimately rejected from the stacked reactor arrangement 24 in any suitable stream, typically the reaction products effluent stream.

One consequence of the flow of the purge stream through the lower conduit 30 is that the pressure of the non-mechanical valve 34 is not less than the pressure of the lower retention chamber 28. The pressure difference between the non-mechanical valve 34 and the lower retention chamber 28 is preferably not less than 2 in. $H_2O$. More preferably, the pressure difference is not less than 10 in. $H_2O$.

Given a steady state condition of constant flow rates of the purge stream and the catalyst particles through the lower conduit 30, the pressure difference across the lower conduit 30 can be affected by two other factors. The first factor is the relative pressure difference between the lower retention chamber 28 and the disengaging hopper 42. In principle, the pressures of the lower retention chamber 28 and the disengaging hopper 42 can vary independently. The lower retention chamber 28 is in communication with the stacked reactor arrangement 24, which is maintained independently with its own atmosphere and at its own pressure by any suitable means, and such means are not essential elements of the present invention. Likewise, the disengaging hopper 42 is in communication with the regeneration vessel 44, which is also maintained independently with its own atmosphere and at its own pressure by any suitable means, and such means are also not essential elements of the present invention. In practice, however, even though the pressure difference between the lower retention chamber and the disengaging hopper can vary, the rate of change of this pressure difference is relatively slow because both the retention chamber and the disengaging hopper are both in communication with vessels and equipment that have large fluid capacities relative to the fluid capacity of the non-mechanical valve arrangement and the lift conduit.

The second factor that can affect the pressure difference across the lower conduit 30 is the relative pressure difference between the non-mechanical valve arrangement 24 and the disengaging hopper 42. As mentioned previously, this pressure difference is the pressure difference across the lift conduit 36 and is measured by the device 40. The reason that this pressure difference must be controlled is that, in practice, the rate of change of this pressure difference is relatively fast when changes occur in the rate of catalyst transport through the lift conduit 36. Moreover, the pressure difference across the lift conduit 36 is preferably not less than 10 in. $H_2O$, and the magnitude of the changes in the pressure difference across the lift conduit can be 150–250 in. $H_2O$, which is large relative to the pressure difference across the lower conduit 30.

These two pressure differences—one across the lower conduit 30 and the other across the lift conduit 36—are maintained at or near to their desired values by a control system that is augmented by the method of this invention. When the final value of the pressure difference ($S_U$) across lift conduit 36 is increased, the computed value of the pressure difference ($S_0$) is initialized and an updated computed value of the pressure difference ($S_1$) is computed. $S_0$ is assigned the value of $S_1$, provided that $S_1$ is less than $S_U$. Device 40 measures the present actual value of the pressure difference, a controller compares $S_1$ and the present actual value, and generates a signal that adjusts the flow of the regulating fluid through the line 14. As the rate of catalyst transport increases, the present actual value of the pressure difference across the lift conduit 36 increases.

The increase in pressure difference across the lift conduit 36 increases the pressure of the valve 34, provided that the pressure of the disengaging hopper 42 is constant. This in turn causes an increase in the pressure difference across the lower conduit 30, provided that the pressure of the lower retention chamber 28 is constant. The pressure difference across the lower conduit 30 can be regulated indirectly, however, by regulating the pressure of the disengaging hopper 42, which in turn can be regulated directly by adding or venting elutriation fluid to or from the disengaging hopper. The reason for this is that, all other things being equal, the pressures of the lift conduit and of the non-mechanical valve rise and fall with the pressure of the disengaging hopper, because the disengaging hopper, the lift conduit, and the vane are in communication with each other. Thus, as the pressure difference across the lower conduit 30 increases, device 20 measures an increase in the present actual value of the pressure difference, a controller compares the desired value for this pressure difference with the present actual value, and the controller generates a signal that adjusts the flow of the elutriation fluid through the line 47. The moles of gas in the disengaging hopper 42 decrease, the pressure of the disengaging hopper 42 decreases, the pressure of the valve 34 decreases, and the pressure difference across the lower conduit 30 decreases to its desired value.

In a similar manner, when $S_U$ is decreased, $S_1$ is computed, and $S_0$ is assigned the value of $S_1$. A controller compares $S_1$ and the present actual value, adjusts the flow of the regulating fluid through the line 22. The rate of catalyst transport decreases, and the present actual value of the pressure difference decreases. This decreases the pressure of the valve 34, and decreases the pressure difference across the lower conduit 30. A controller compares the desired value for this pressure difference with the present actual value and adjusts the flow of the elutriation fluid through the line 47. The pressure of the disengaging hopper 42 increases, and the pressure difference across the lower conduit 30 increases to its desired value.

As described previously, the steps of computing an updated computed value, and actuating a control valve to control the rate of catalyst transport are part of a cycle of steps that repeats at least twice to increase the computed value to the final value. The magnitude and the frequency of changes in the computed value and the control valve actuation can be varied. Preferably, the changes are made so that the pressure difference across the lower conduit 30 is substantially constant. By substantially constant in this context it is meant that the pressure difference will vary between 0.5 and 1.5 times the average pressure difference. Also, preferably, the changes are made so that the flow rate of the make-up elutriation gas that is added through line 47 to the disengaging hopper 42 is substantially constant. By substantially constant in this context it is meant that the flow rate of the make-up gas will vary between 0.1 and 3.0 times the average flow rate of the make-up gas. To achieve these objectives, it is within the scope of this invention that the computed value is increased or decreased continuously, the signal to the control valve is generated continuously, and the control valve is actuated continuously. These continuous changes may be accomplished by mechanical means, such as cams or ramps.

It may be desirable, while increasing or decreasing the computed value, to prevent the signal generated from the computed value from regulating the control valve that regulates the rate of transport of catalyst. In some modes of operation, a preferred alternative for regulating the control valve is a signal generated from the inventory or level of catalyst in one of the vessels in the reactor-regenerator system. Thus, a signal generated from the level of catalyst at the top 26 of the stacked reactor arrangement 24 may be substituted for, or override, the signal generated from the computed value. Another preferred alternative is a signal generated from an instrument or hopper that measures or controls the rate of catalyst circulation through other sections of the reactor-regenerator system. Thus, a signal generated from the rate of catalyst transport by the lock hopper arrangement 52 may also override the computed value. This second alternative is preferable on the regenerator side of the process, where the lock hopper arrangement 52 may be used to control the rate of catalyst transport through and the pressure difference of the lift conduit 16 using the non-mechanical valve 17.

What is claimed is:

1. A method for controlling the transport of particles from a source zone to a destination zone comprising:

a) passing a transport stream comprising a fluid to a source zone;

b) withdrawing particles and said source zone, and passing said particles and said fluid through a conduit and to a destination zone;

c) determining a computed value of an indicator that is in response to the rate of transport of said particles from said source zone to said destination zone;

d) comparing said computed value with the actual value of said indicator and generating a control signal that is in response to the difference between said computed value and said actual value;

e) employing said control signal to actuate a means to control the rate of transport of particles from said source zone to said destination zone;

f) increasing or decreasing said computed value in at least two increments to a final value of said indicator;

g) comparing at least two different increased or decreased computed values with the actual value of said indicator and updating said control signal at least twice in response to the difference between said increased or decreased computed values and said actual value to sequentially generate at least two updated control signals; and h) employing said updated control signals at least twice to actuate said means to control the rate of transport of particles from said source zone to said destination zone so that a steady state rate of transport of particles is attained after each said employment of said updated control signal.

2. The method of claim 1 further characterized in that said indicator is the pressure difference between said source zone and said destination zone.

3. The method of claim 1 further characterized in that said actual value and said final value of said indicator are compared after said computed value is increased or decreased to said final value.

4. The method of claim 1 wherein said computed value is increased to said final value of said indicator.

5. The method of claim 1 wherein said computed value is decreased to said final value of said indicator.

6. The method of claim 1 further characterized in that said means to control comprises a valve operably located so as to control the flow of said transport stream to said source zone.

7. The method of claim 1 further characterized in that said computed value is increased or decreased continuously to said final value, said updated control signal is generated continuously, and said updated control signal continuously actuates said means to control.

8. The method of claim 1 further characterized in that said source zone is in communication with a supply zone, said source zone and said supply zone operate at pressures that differ by a source differential pressure, and said means to control is increased or decreased so that said source differential pressure is substantially constant.

9. The method of claim 8 further characterized in that said source differential pressure is between 0.5 and 1.5 times the average of said source differential pressure.

10. The method of claim 1 further characterized in that at least a portion of said fluid is recycled from said destination zone to said source zone and is combined with a make-up stream comprising said fluid, and said means to control is increased or decreased so that the flow rate of said make-up stream is substantially constant.

11. The method of claim 10 further characterized in that the range of flow rate of said make-up stream is between 0.1 and 3.0 times the average flow rate of said make-up stream.

12. A hydrocarbon conversion process for contacting a hydrocarbon-containing feedstream with a particulate catalyst at hydrocarbon conversion conditions in a reaction zone, deactivating said catalyst in said reaction zone, passing said catalyst from a bottom location in said reaction zone to a top location in a regeneration zone, reactivating said catalyst in said regeneration zone and passing said catalyst from a bottom location in said regeneration zone to a top location in said reaction zone, said process comprising controlling the transport of said catalyst from said bottom to said top locations by the steps of:

a) passing said catalyst downwardly from said bottom location to a fluid-controlled valve;

b) regulating the flow of a fluid to said fluid-controlled valve to deliver said catalyst to a lift conduit;

c) conveying said catalyst upwardly through said lift conduit with said fluid and discharging said catalyst to said top location;

d) determining a computed value of the pressure difference across at least a portion of said lift conduit;

e) comparing said computed value with the actual value of the pressure difference across said portion of said lift conduit, and generating a control signal that is in response to the difference between said computed value and said actual value;

f) employing said control signal to regulate the flow of said fluid to said fluid-controlled valve to deliver catalyst to said lift conduit;

g) increasing or decreasing said computed value in at least two increments to a final value of the pressure difference using the equation:

$$S_1 = S_0 * (1 + X)$$

where $S_0$ is a previous computed value, $S_1$ is said increased or decreased computed value, and X is a number greater than −1.0 and less than 1.0;

h) comparing at least two different increased or decreased computed values with the actual value of the pressure difference, and updating said control signal at least twice in response to the difference between said increased or decreased computed values and said actual value to sequentially generate at least two updated control signals; and i) employing said updated control signals at least twice to regulate the flow of said fluid to said fluid-controlled valve to deliver catalyst to said lift conduit so that a steady state rate of transport of particles is attained after each said employment of said updated control signal.

13. The process of claim 12 wherein X is between 0.025 and 1.0.

14. The process of claim 13 wherein X is between 0.1 and 0.5.

15. The process of claim 12 wherein X is between −0.025 and 1.0.

16. The process of claim 15 wherein X is between −0.1 and −0.5.

17. The process of claim 12 further characterized in that said updated control signal is generated at least every 60 seconds.

18. The process of claim 17 wherein said updated control signal is generated at least every 0.1 seconds.

19. The process of claim 12 further characterized in that, while said computed value is increased or decreased to said final value, an inventory signal is generated in response to the difference between a desired value of an indication of the inventory of said catalyst in at least a portion of at least one of said reaction zone and said regeneration zone and the actual value of said indication of said inventory, and that said inventory signal is employed to regulate the flow of said fluid to said fluid-controlled valve.

20. The process of claim 12 further characterized in that, while said computed valve is increased or decreased to said final value, a transport signal is generated in response to the difference between a desired value of the rate of transport of said catalyst to said lift conduit and the actual value of said rate of transport, and that said transport signal is employed to regulate the flow of said fluid to said fluid-controlled value.

21. The process of claim 12 further characterized in that said fluid-controlled valve is an L-valve and said fluid is a gas stream.

22. The process of claim 12 wherein said hydrocarbon conversion process is reforming.

23. The process of claim 12 wherein said process transports catalyst from bottom locations in both said reactor and regeneration zones to top locations in both said reactor and regeneration zones.

* * * * *

UNITED STATES PATENT AND TRADEMARK OFFICE
CERTIFICATE OF CORRECTION

PATENT NO.   : 5,500,110
DATED        : March 19, 1996
INVENTORS    : Paul A. Sechrist, Roger R. Lawrence, Frank T. Micklich,
               Larry D. Richardson, David M. Kazell It is certified that error appears in the above-identified patent and that said Letters Patent is hereby corrected as shown below:

Column 12, line 3-5, should read b) withdrawing particles and said fluid from said source zone, and passing said particles and said fluid through a conduit and to a destination zone;

Signed and Sealed this

Twenty-fifth Day of June, 1996

Attest:

BRUCE LEHMAN

Attesting Officer         Commissioner of Patents and Trademarks